United States Patent
Lee et al.

(10) Patent No.: US 8,907,646 B2
(45) Date of Patent: Dec. 9, 2014

(54) POWER CONVERTING CIRCUIT AND FEEDBACK CONTROL CIRCUIT

(75) Inventors: Li-Min Lee, New Taipei (TW); Chung-Che Yu, New Taipei (TW); Shian-Sung Shiu, New Taipei (TW); Quan Gan, Wuxi (CN)

(73) Assignee: Green Solution Technology Co., Ltd., New Taipei (TW)

( * ) Notice: Subject to any disclaimer, the term of this patent is extended or adjusted under 35 U.S.C. 154(b) by 547 days.

(21) Appl. No.: 13/236,613

(22) Filed: Sep. 19, 2011

(65) Prior Publication Data

US 2012/0268085 A1   Oct. 25, 2012

(30) Foreign Application Priority Data

Apr. 21, 2011   (CN) .......................... 2011 1 0100793

(51) Int. Cl.
*H02M 3/156* (2006.01)
*H02M 3/158* (2006.01)
*H02M 1/00* (2006.01)

(52) U.S. Cl.
CPC ...... *H02M 3/158* (2013.01); *H02M 2001/0025* (2013.01)
USPC ........................................................ 323/284

(58) Field of Classification Search
USPC .......................... 323/282, 283, 284, 285, 351
See application file for complete search history.

(56) References Cited

U.S. PATENT DOCUMENTS

| | | | |
|---|---|---|---|
| 4,654,770 A * | 3/1987 | Santurtun et al. ................ 363/17 |
| 7,495,423 B1 * | 2/2009 | Knight et al. ................. 323/284 |
| 8,604,769 B2 * | 12/2013 | Murakami .................... 323/284 |
| 2010/0066331 A1 * | 3/2010 | Chang et al. .................. 323/282 |

* cited by examiner

*Primary Examiner* — Gary L Laxton
*Assistant Examiner* — Afework Demisse
(74) *Attorney, Agent, or Firm* — Jianq Chyun IP Office

(57) ABSTRACT

A power converting circuit and a feedback control circuit for the power converting circuit are disclosed. The feedback control circuit comprises a feedback controller and a level controlling unit. The feedback controller generates a feedback control signal according to a reference voltage signal and a feedback signal. The level controlling unit receives one of the reference voltage signal and the feedback signal and modules a level of the received signal from a first level to a second level with time according to a level adjusting signal.

19 Claims, 3 Drawing Sheets

US 8,907,646 B2

POWER CONVERTING CIRCUIT AND FEEDBACK CONTROL CIRCUIT

CROSS-REFERENCE TO RELATED APPLICATION

This application claims the priority benefit of China application serial no. 201110100793.0, filed on Apr. 21, 2011. The entirety of the above-mentioned patent application is hereby incorporated by reference herein and made a part of this specification.

BACKGROUND OF THE INVENTION (1) Field of the Invention

This invention relates to a power converting circuit and a feedback control circuit thereof, and more particularly relates to a power converting circuit with level or output adjustment and a feedback control circuit thereof.

(2) Description of the Prior Art

FIG. 1 is a circuit diagram of a typical power converting circuit, which is capable of varying the level of output voltage. The power converting circuit includes a control circuit Con, transistor switches SW1, SW2, and SW3, an inductor L, an output capacitor C, and resistors R1, R2, and R3, and is utilized for converting an input power source Vin into an output voltage Vout to drive a load Ld. The resistors R1 and R2 are serially connected between the node for accessing the output voltage Vout and a zero volts reference end, which may be a grounded end, so as to compose a voltage divider for generating an output voltage feedback signal VFB. The resistor R3 and the transistor switch SW3 are serially connected between the junction of the resistors R1 and R2 and a zero volts reference end, and the on/off state of the transistor switch SW3 is switched according to an output switching signal S3 such that the division ratio of the voltage divider can be modulated. The control circuit Con receives the output voltage feedback signal VFB so as to generate the control signals S1 and S2 to respectively control the switching of the transistor switches SW1 and SW2 for tuning the level of the output voltage Vout to a predetermined level. Since the control circuit Con has the level of the output voltage Vout stabilized according to the output voltage feedback signal VFB, the changing of division ratio may lead to different stabilized levels of the output voltage Vout for the purpose of multi-level output.

However, the usage of the transistor switch SW3 for connecting or disconnecting the resistor R3 to the resistors R1 and R2 to rapidly change the ratio of the levels of the output voltage feedback signal VFB and the output voltage Vout, the above mentioned division ratio, may induce severe overshooting or undershooting events in the duration to have the output voltage Vout be modulated to a new level.

In present, some approaches for alleviating the overshooting event and the undershooting event has been disclosed, and the most familiar approaches include minimizing the inductance of the inductor L to reduce the power stored in the inductor L, increasing the capacitance of the output capacitor C to slow down the changing of the output voltage Vout, and using a low-pass filter to reduce ringing effect on the output voltage feedback signal VFB. In addition, FIG. 2 shows a circuit diagram of another typical power converting circuit, which applies a switching speed adjusting signal VS to adjust the switching speed of the transistor switch SW3 form totally on to totally off and vice versa so as to slow down the operation of adjusting the voltage division ratio to alleviate the overshooting and undershooting events.

Even with the above mentioned approaches, the overshooting and undershooting events are still an important issue to be resolved and the object to find out a different solution with broader applications and additional circuit protection is a subject to pursue.

SUMMARY OF THE INVENTION

According to the problems addressed in prior art, a technological solution for resolving the overshooting and undershooting events in feedback control is provided with an integrated protection circuit to improve operational safety for the power converting circuit.

For achieving the above mentioned object, a feedback control circuit is provided in accordance with an embodiment of the present invention. The feedback control circuit includes a feedback controller and a level control unit. The feedback controller generates a feedback control signal according to a reference voltage signal and a feedback signal. The level control unit receives one of the reference voltage signal and the feedback signal as a received signal and has the received signal shifted from a first level to a second level according to a level adjusting signal.

Another feedback control circuit is also provided in accordance with an embodiment of the present invention. The feedback control circuit includes an amplifier and an amplifier modulating unit. The amplifier receives a reference voltage signal and a feedback signal, and outputs an error amplifying signal accordingly. The amplifier modulating unit receives the reference voltage signal and the feedback signal, and adjusts driving ability of the amplifier based on a predetermined procedure according to a level difference between the reference voltage signal and the feedback signal.

A power converting circuit is also provided in accordance with an embodiment of the present invention. The power converting circuit includes a converting unit and a feedback control circuit. The converting unit is adapted to convert an input power source to supply an output voltage. The feedback control circuit is coupled to the converting unit for generating a duty-cycle control signal according to a feedback signal representing the output voltage to control power conversion of the converting unit. The feedback control circuit includes a level control unit which shifts a level of the feedback signal from a first level to a second level according to a level adjusting signal.

According to an embodiment of the present invention, the feedback control circuit includes an output protection unit, which determines whether to output a protection signal or not according to the reference voltage signal and the feedback signal.

According to another embodiment of the present invention, the output protection unit outputs the protection signal under one of the two statuses including a level of the feedback signal being lower than a first predetermined ratio of a level of the reference voltage signal and the level of the feedback signal being higher than a second predetermined ratio of the level of the reference voltage signal. The first predetermined ratio is smaller than one and the second predetermined ratio is greater than one.

BRIEF DESCRIPTION OF THE DRAWINGS

The present invention will now be specified with reference to its preferred embodiment illustrated in the drawings, in which.

DESCRIPTION OF THE PREFERRED EMBODIMENT

Figure 1:
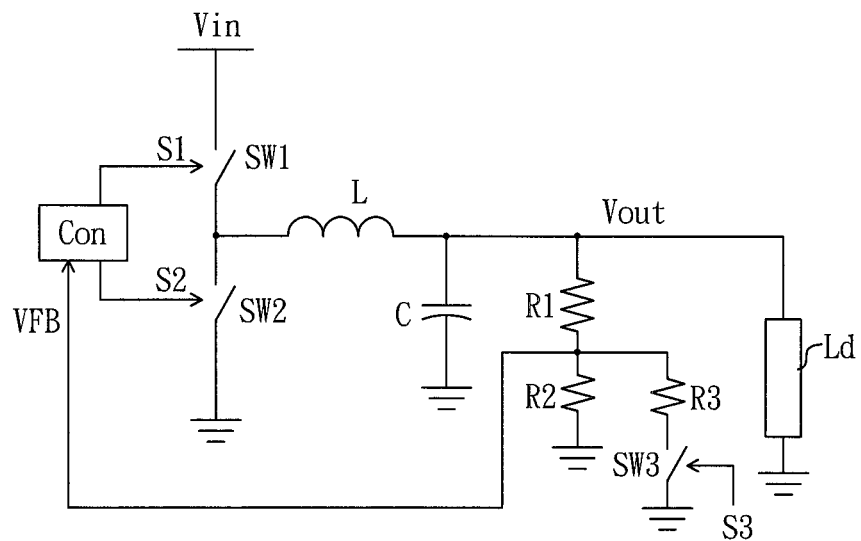
FIG. 1 is a circuit diagram of the typical power converting circuit.
Figure 2:
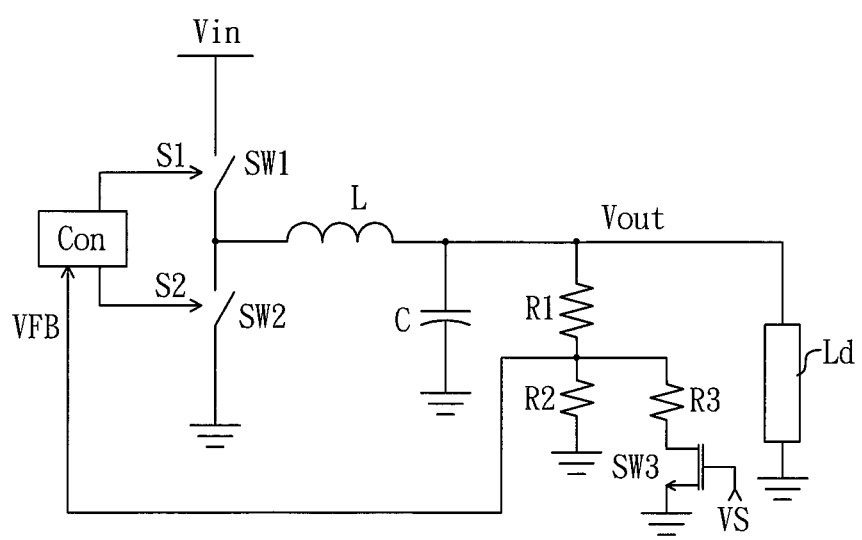
FIG. 2 is a circuit diagram of another typical power converting circuit.
Figure 3:
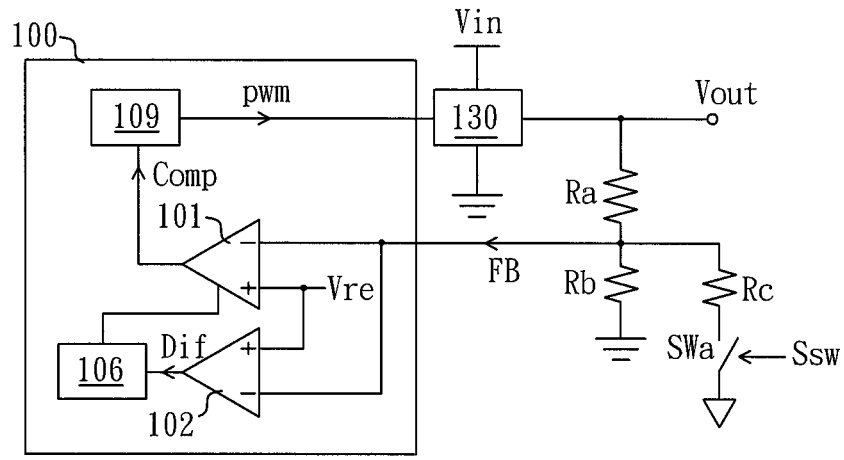
FIG. 3 is a circuit diagram of a power converting circuit in accordance with a first embodiment of the present invention.

FIG. 3 is a circuit diagram of a power converting circuit in accordance with a first embodiment of the present invention. The power converting circuit includes a feedback control circuit 100 and a converting unit 130. The converting unit 130 is coupled to an input power source Vin for converting the input power source Vin into an output voltage Vout. The converting unit 130 may be a DC-DC converting circuit, such as a DC-DC boost converter, a DC-DC buck converter, a DC-DC buck-boost converter, a DC-DC flyback converter, a DC-DC forward converter, a DC-DC half-bridge converter, a DC-DC full-bridge converter, and etc. The power converting circuit also has a voltage divider which includes resistors Ra and Rb serially connected between the output end of the converting unit 130 and a ground for generating a feedback signal FB according to the output voltage Vout. The voltage divider also has a resistor Rc and a switch SWa. One end of the resistor Rc is coupled to a junction between the resistors Ra and Rb and the other end thereof is coupled to a reference level end, such as a zero volts node, the output end of the converting circuit, or any common level node as a reference for the circuit, through the switch SWa. The switch SWa is switched according to a level adjusting signal Ssw for modulating the voltage division ratio of the voltage divider to change the level of the feedback signal FB.

The feedback control circuit 100 receives the feedback signal FB and generates a duty-cycle control signal pwm to control power conversion of the converting unit 130. The feedback control circuit 100 includes an amplifier 101, an amplifier modulating unit, and a duty-cycle control unit 109. The amplifier modulating unit includes an error determining unit 102 and a modulating unit 106. The amplifier 101 has an inverting input receiving the feedback signal FB and a non-inverting input receiving a reference voltage signal Vre so as to proceed charging/discharging operations to a compensation unit (not shown) for generating an error amplifying signal Comp. The duty-cycle control unit 109 decides the duty-cycle of the duty-cycle control signal pwm according to the error amplifying signal Comp so as to adjust the power being transmitted from the input power source Vin to the output end of the converting unit 130 to have the output voltage Vout at the output end stabilized around a predetermined level. The error determining unit 102 receives the feedback signal FB and the reference voltage signal Vre and generates a level difference signal Dif, which represents the level difference of the feedback signal FB and the reference voltage signal Vre, to the modulating unit 106. The modulating unit 106 adjusts power output ability (driving ability) of the amplifier 101 according to the level difference signal Dif, which may be understood as the charging/discharging ability for the compensation unit. That is, as a level difference between the feedback signal FB and the reference voltage signal Vre is small, the amplifier 101 is modulated to have greater power output ability. The power output ability would be degraded responsive to the increasing of level difference. Thus, as the level of the feedback signal FB is rapidly shifted from an original level equal to that of the reference voltage signal Vre to a new one because of the level adjusting signal Ssw, the response of the amplifier 101 to the compensation unit for the level variation would be alleviated to slow down the changing of the error amplifying signal Comp to achieve the object of alleviating overshooting and undershooting events.

Moreover, in the beginning of the start-up duration of the power converting circuit, the output voltage Vout is enhanced from zero volts, and a large level difference between the feedback signal FB and the reference voltage signal Vre is resulted. The power output ability of the amplifier 101 is low at first and gradually increased that accompanies with the decreasing of level difference. Thus, the power converting circuit in accordance with the present embodiment of the present invention may have an integrated soft-start function.

Figure 4:
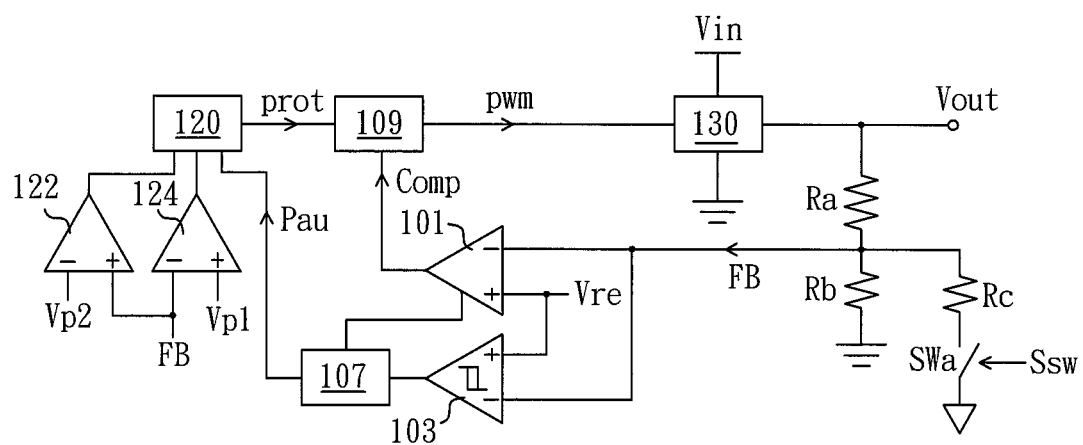
FIG. 4 is a circuit diagram of a power converting circuit in accordance with a second embodiment of the present invention.

FIG. 4 is a circuit diagram of a power converting circuit in accordance with a second embodiment of the present invention. As shown, the power converting circuit includes a feedback control circuit and a converting unit 130. The feedback control circuit includes am amplifier 101, an amplifier modulating unit, an output protection unit, and a duty-cycle control unit 109. The amplifier modulating unit includes an error hysteresis determining unit 103 and a modulating unit 107. The output protection unit includes an over-voltage determining unit 122, an under-voltage determining unit 124, and a protection determining unit 120. The error hysteresis determining unit 103 receives a reference voltage signal Vre and a feedback signal FB and alters its output logic as the level of the feedback signal FB is lower than a first predetermined voltage level or higher than a second predetermined voltage level. For example, as the level of the feedback signal FB is over or under a predetermined modulating ratio, such as 20% of the reference voltage signal Vre, the error hysteresis determining unit 103 may alter its output logic when the level of the feedback signal is above 120% of the reference voltage signal Vre or below 80% of the reference voltage signal Vre in a sudden. The modulating unit 107 is coupled to the output end of the error hysteresis determining unit 103 and adjusts power output ability of the amplifier 101 according to a predetermined procedure when detecting the changing of output logic of the error hysteresis determining unit 103. For example, the modulating unit 107 may cut off 50% the output power of the amplifier 101 in a predetermine time period and then has the output power back to 100%; the modulating unit 107 may maintain the output power of the amplifier 101 in a first predetermined time period, have the output power reduce to 50% the original output power in a following second predetermined time period, and finally have the output power back to 100%. Of course, the modulating unit 107 may determine a suitable timing for adjusting power output ability of the amplifier 101 according to the reference voltage signal Vre and the feedback signal FB instead of using a fixed predetermined time period. For example, when the level difference between the feedback signal FB and the reference voltage signal Vre is over 20% the reference voltage signal Vre, the modulating unit 107 would be enabled and may modulate the power output ability of the amplifier 101 to −50% the original power output ability of the amplifier 101 (the negative sign indicates exchanging of charging and discharging operation) when the level difference is reduced to 5%, and has the amplifier 101 retrieve its power output ability when the level difference is reversely enhanced to 10%. The reversely enhancement of the level difference indicates that the adjustment for the duty-cycle of the duty-cycle control signal pwm generated by the duty-cycle control unit 109 is insufficient, and thus the power output ability of the amplifier 101 should be retrieved to 100%. When adjusting power output ability of the amplifier 101 according to the predetermined procedure, the modulating unit 107 may output a protection pause signal Pau to have the protection determining unit 120 temporarily stop outputting a protection signal prot to the duty-cycle control unit 109 to prevent misjudgment.

The operation of the output protection unit is described below. The output protection unit is utilized for determining whether or not the output voltage Vout is too high or too low. If so, the output protection unit may output the protection signal prot to the duty-cycle control unit 109 to have the duty-cycle control unit 109 stop outputting the duty-cycle control signal pwm. The over-voltage determining unit 122 in the output protection unit receives the feedback signal FB and an over-voltage reference signal Vp2 and outputs a high level signal when the level of the feedback signal FB is higher than that of the over-voltage reference signal Vp2. The under-voltage determining unit 124 in the output protection unit receives the feedback signal FB and an under-voltage reference signal Vp1 and outputs a high level signal when the level of the feedback signal FB is lower than the under-voltage reference signal Vp1. The above mentioned under-voltage reference signal Vp1 and the over-voltage reference signal Vp2 may be adequately set according to the reference voltage signal Vre. For example, the level of the under-voltage reference signal Vp1 may be set equal to 60% the level of the reference voltage signal Vre, the level of the over-voltage reference signal Vp2 may be set equal to 120% the level of the reference voltage signal Vre. The protection determining unit 120 may output the protection signal prot to have the feedback control circuit entering protection mode as one of the over-voltage determining unit 122 and the under-voltage determining unit 124 has high level output signal. However, if the modulating unit 107 simultaneously outputs the protection pause signal Pau to the protection determining unit 120, the protection determining unit 120 may temporarily stop outputting the protection signal prot even if the over-voltage determining unit 122 or the under-voltage determining unit 124 has high level output. If level change of the feedback signal FB is resulted from abnormal conditions on the circuit instead of the level adjusting signal Ssw, the modulating unit 107 may stop outputting the protection pause signal Pau after the predetermined procedure is ended. Meanwhile, the level of the output voltage Vout is stayed in the abnormal level range, that is, the level of the feedback signal FB is higher than the over-voltage reference signal Vp2 or lower than the under-voltage reference signal Vp1, and the protection determining unit 120 may output the protection signal prot to have the feedback control circuit entering the protection mode.

Figure 5:
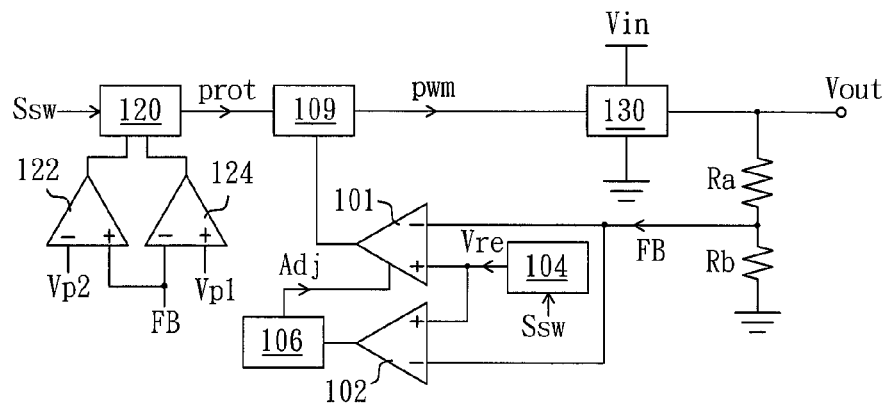
FIG. 5 is a circuit diagram of a power converting circuit in accordance with a third embodiment of the present invention.

FIG. 5 is a circuit diagram of a power converting circuit in accordance with a third embodiment of the present invention. In contrast with the embodiments in FIGS. 3 and 4, the present invention achieves the object of adjusting the level of the output voltage Vout through modulating the level of the reference voltage signal according to the level adjusting signal Ssw. The power converting circuit includes a feedback control circuit and a converting unit 130. The feedback control circuit includes an amplifier 101, an amplifier modulating unit, an output protection unit, and a duty-cycle control unit 109. The amplifier modulating unit includes an error determining unit 102 and a modulating unit 106. The output protection unit includes an over-voltage determining unit 122, an under-voltage determining unit 124, and a protection determining unit 120. The circuit operation of the amplifier modulating unit, the under-voltage determining unit 124, and the protection determining unit 120 may be referred to the embodiments of FIGS. 3 and 4 and thus are not repeated here. The feedback control circuit also includes a reference voltage generator 104 for generating a reference voltage signal Vre, and the reference voltage generator 104 also receives the level adjusting signal Ssw for adjusting the level of the reference voltage signal Vre. In addition, the protection determining unit 120 also receives the level adjusting signal Ssw and stops outputting the protection signal prot in a predetermined time period after the level of the reference voltage signal Vre being adjusted to prevent misjudgment.

Figure 6:
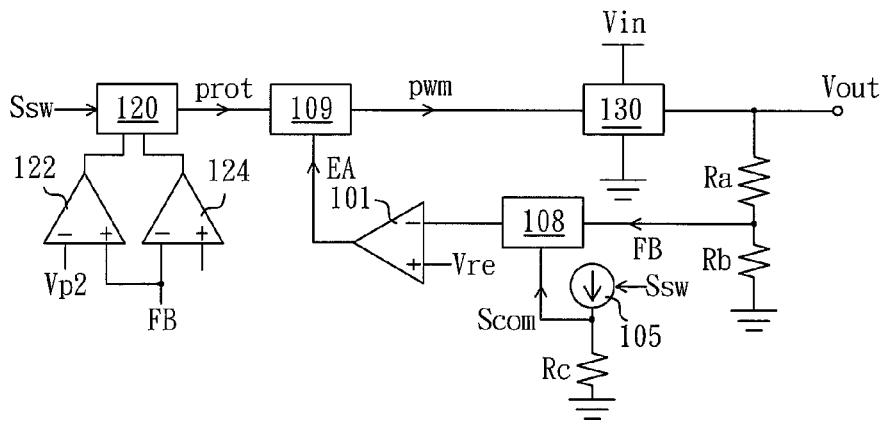
FIG. 6 is a circuit diagram of a power converting circuit in accordance with a fourth embodiment of the present invention.

FIG. 6 is a circuit diagram of a power converting circuit in accordance with a fourth embodiment of the present invention. As shown, the power converting circuit includes a feedback control circuit and a converting unit 130. The feedback control circuit includes a feedback controller, a level control unit, a duty-cycle control unit 109, and an output protection unit. In the present embodiment, the feedback controller includes an amplifier 101, and the level control unit includes a level adjusting reference unit and a signal adjusting unit 108. The level adjusting reference unit includes a controllable current source 105 and a resistor Rc. Various output voltage levels may be set through adjusting the resistance of the resistor Rc. The serially connected resistors Ra and Rb compose a voltage divider, which has one end coupled to the output end of the converting unit 130 and the other end grounded so as to generate a feedback signal FB with respect to the level of the output voltage Vout. The amplifier 101 receives a reference voltage signal Vre and the feedback signal FB so as to generate a feedback control signal EA to the duty-cycle control unit 109 to have the duty-cycle control unit 109 adjust the duty-cycle of the duty-cycle control signal pwm to control power conversion operation of the converting unit 130. The controllable current source 105 is enabled according to the received level adjusting signal Ssw so as to supply a current flow, which is adjusted according to a predetermined procedure, flowing through the resistor Rc to generate an adjusting signal Scorn. The signal adjusting unit 108 receives the feedback signal FB and the adjusting signal Scorn and adjusts the level of the feedback signal FB according to the level of the adjusting signal Scorn so as to have the level of the feedback signal FB shifted from the first level to the second level. Because the level shifting process of the feedback signal FB is carried out according to the predetermined procedure instead of an abrupt changing, the problems of overshooting or undershooting events may be relieved. The output protection unit includes an over-voltage determining unit 122, an under-voltage determining unit 124, and a protection determining unit 120. Circuit operations of the amplifier modulating unit, the under-voltage determining unit 124, and the protection determining unit 120 may be referred to FIG. 5 and the respective description.

The level adjusting unit in the present embodiment may be also carried out by adjusting the level of the reference voltage signal Vre instead of the feedback signal FB for achieve the objects of relieving overshooting or undershooting events. In addition, the controllable current source 105 may enhance the level of the reference voltage signal Vre from zero volts to a predetermined level according to a predetermined soft-start process after receiving a start-up signal. Thus, the circuit provided in the present embodiment also has integrated soft-start function.

Figure 7:
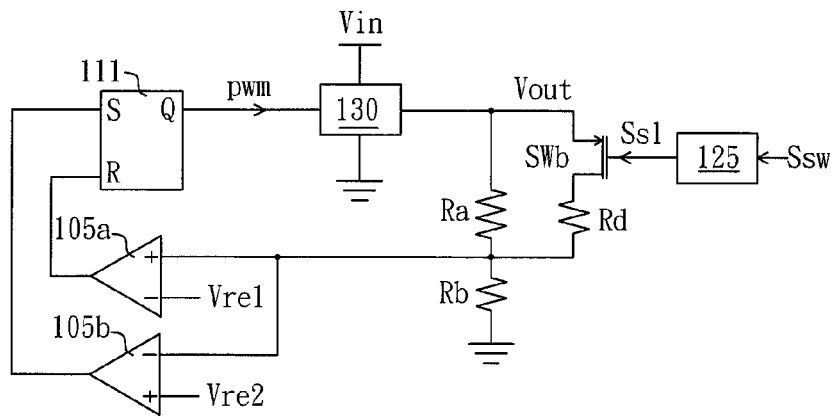
FIG. 7 is a circuit diagram of a power converting circuit in accordance with a fifth embodiment of the present invention.

FIG. 7 is a circuit diagram of a power converting circuit in accordance with a fifth embodiment of the present invention.

The power converting circuit includes a feedback control circuit and a converting unit 130. A major difference between the present embodiment and the above mentioned embodiments is that the error amplifier in the feedback control circuit is replaced by the SR flip-flop 111. In detail, the feedback control circuit in the present embodiment includes a first comparator 105a, a second comparator 105b, and the SR flip-flop 111. The first comparator 105a receives a first reference voltage signal Vre1 and the feedback signal FB and generates a high level signal to the reset input R of the SR flip-flop 111 to have the duty-cycle control signal pwm generated by the SR flip-flop 111 become low as the level of the feedback signal FB is higher than the level of the first reference voltage signal Vre1. The second comparator 105b receives a second reference voltage signal Vre2 and the feedback signal FB and generates a high level signal to the set input S of the SR flip-flop 111 to have the duty-cycle control signal pwm generated by the SR flip-flop 111 become high as the level of the feedback signal FB is lower than the level of the second reference voltage signal Vre2. Therefore, the level of the feedback signal FB may be maintained in the range between the levels of the first reference voltage signal Vre1 and the lower second reference voltage signal Vre2 with the ratio of high level period and low level period of the duty-cycle control signal pwm, the duty-cycle, being adequately modulated.

In addition, the circuit design of the level control unit in the present embodiment is also different from the above mentioned embodiments. In the present embodiment, the level control unit includes an impedance unit Rd, a transistor SWb, and a switching control unit 125. The impedance unit Rd and the transistor SWb are serially connected between the divided voltage output node of the voltage divider, which is also the junction between the resistors Ra and Rb, and an zero volts end or any common level end in the circuit, such as the output end of the converting unit 130. In the present embodiment, the impedance unit Rd and the transistor SWb are serially connected between the output end of the converting unit 130 and the divided voltage output node of the voltage divider for adjusting the level of the feedback signal FB according to the output voltage Vout. The switching control unit 125 receives a level adjusting signal Ssw and outputs a control signal Ss1 accordingly. In the present embodiment, the transistor SWb is a metal-oxide-semiconductor field-effect transistor (MOSFET), and the level of the control signal Ss1 is set to be varied with a predetermined level variation speed in the level range with respect to the linear region of the transistor SWb so as to control the variation speed from the cut-off region, which is corresponded to off state of the transistor SWb, to the saturation region, which is corresponded to on state of the transistor SWb, or from the saturation region to the cut-off region. Thereby, the equivalent resistance of the transistor SWb would be gradually increased or decreased to achieve the object of changing the level of the feedback signal FB with time.

While the preferred embodiments of the present invention have been set forth for the purpose of disclosure, modifications of the disclosed embodiments of the present invention as well as other embodiments thereof may occur to those skilled in the art. Accordingly, the appended claims are intended to cover all embodiments which do not depart from the spirit and scope of the present invention.

What is claimed is:

1. A feedback control circuit, comprising:
   a feedback controller, generating a feedback control signal according to a reference voltage signal and a feedback signal;
   a level control unit, receiving one of the reference voltage signal and the feedback signal as a received signal and having the received signal shifted from a first level to a second level according to a level adjusting signal; and
   an output protection unit, temporarily stopping outputting a protection signal for a predetermined time period after receiving the level adjusting signal.

2. The feedback control circuit of claim 1, wherein the output protection unit determines whether to output the protection signal or not according to the reference voltage signal and the feedback signal.

3. The feedback control circuit of claim 2, wherein the level control unit includes an impedance unit, a transistor, and a switching control unit, the impedance unit and the transistor are utilized for adjusting a level of the feedback signal, and the switching control unit is utilized for adjusting a switching speed of the transistor switched from a saturation region to a cut-off region.

4. The feedback control circuit of claim 3, wherein the impedance unit is coupled to a voltage divider, and the voltage divider is coupled to an output end of a converting unit for generating the feedback signal.

5. The feedback control circuit of claim 4, wherein the impedance unit and the transistor are serially connected between the output end and a divided voltage output end of the voltage divider.

6. The feedback control circuit of claim 1, wherein the level control unit includes a level adjusting reference unit and a signal adjusting unit, the level adjusting reference unit receives the level adjusting signal and generates an adjusting signal with a level being adjusted according to a predetermined procedure, and the signal adjusting unit adjusts one of the reference voltage signal and the feedback signal according to the level of the adjusting signal.

7. The feedback control circuit of claim 6, wherein the level adjusting reference unit includes a controllable current source with a current flow being controlled according to the predetermined procedure.

8. The feedback control circuit of claim 1, wherein the feedback controller includes an amplifier, which generates an error amplifying signal according to the reference voltage signal and the feedback signal.

9. The feedback control circuit of claim 2, wherein the level control unit includes a level adjusting reference unit and a signal adjusting unit, the level adjusting reference unit receives the level adjusting signal and generates an adjusting signal with a level being adjusted according to a predetermined procedure, and the signal adjusting unit adjusts one of the reference voltage signal and the feedback signal according to the level of the adjusting signal.

10. The feedback control circuit of claim 9, wherein the level adjusting reference unit includes a controllable current source with a current flow being controlled according to the predetermined procedure.

11. The feedback control circuit of claim 2, wherein the output protection unit outputs the protection signal under one of the two statuses including:
   a) a level of the feedback signal being lower than a first predetermined ratio of a level of the reference voltage signal; and
   b) the level of the feedback signal being higher than a second predetermined ratio of the level of the reference voltage signal;
   wherein the first predetermined ratio is smaller than one and the second predetermined ratio is greater than one.

12. A feedback control circuit comprising:
an amplifier, receiving a reference voltage signal and a feedback signal, and outputting an error amplifying signal accordingly; and
an amplifier modulating unit, receiving the reference voltage signal and the feedback signal, and adjusting driving ability of the amplifier based on a predetermined procedure according to a level difference between the reference voltage signal and the feedback signal,
wherein the driving ability of the amplifier is reduced responsive to the increasing of the level difference.

13. The feedback control circuit of claim 12, further comprising an output protection unit, which determines whether to output a protection signal or not according to the reference voltage signal and the feedback signal.

14. The feedback control circuit of claim 13, wherein the output protection unit outputs the protection signal under one of two statuses including:
a) a level of the feedback signal being lower than a first predetermined ratio of a level of the reference voltage signal; and
b) the level of the feedback signal being higher than a second predetermined ratio of the level of the reference voltage signal;
wherein the first predetermined ratio is smaller than one and the second predetermined ratio is greater than one.

15. The feedback control circuit of claim 12, wherein the amplifier modulating unit adjusts the driving ability of the amplifier when determining that the level difference is greater than a predetermined adjusting value.

16. The feedback control circuit of claim 12, further comprising an output protection unit, wherein the output protection unit outputs the protection signal under one of two statuses including:
a) a level of the feedback signal being lower than a first predetermined ratio of a level of the reference voltage signal; and
b) the level of the feedback signal being higher than a second predetermined ratio of the level of the reference voltage signal;
wherein the first predetermined ratio is smaller than one and the second predetermined ratio is greater than one.

17. A power converting circuit comprising:
a converting unit, adapted to convert an input voltage to supply an output voltage; and
a feedback control circuit, coupled to the converting unit, for generating a duty-cycle control signal according to a feedback signal representing the output voltage to control power conversion of the converting unit, and the feedback control circuit including a level control unit which shifting a level of the feedback signal from a first level to a second level according to a level adjusting signal,
wherein the feedback control circuit includes an output protection unit which temporarily stops outputting a protection signal for a predetermined time period after receiving the level adjusting signal.

18. The power converting circuit of claim 17, wherein the output protection unit generates the protection signal under one of two statuses including:
a) a level of the output voltage being lower than a first predetermined voltage level; and
b) the level of the output voltage being higher than a second predetermined voltage level.

19. The power converting circuit of claim 17, wherein the level control unit includes an impedance unit, a transistor, and a switching control unit, the impedance unit and the transistor are serially connected for adjusting a level of the feedback signal, and the switching control unit is utilized for adjusting a switching speed of the transistor switched from a saturation region to a cut-off region.

* * * * *